United States Patent
Dershem

(10) Patent No.: US 11,066,220 B2
(45) Date of Patent: Jul. 20, 2021

(54) BUNGEE DEVICE AND METHOD OF USE

(71) Applicants: Jeffrey L. Dershem, Zionsville, PA (US); Deborah L. Dershem, Zionsville, PA (US)

(72) Inventor: Jeffrey L. Dershem, Zionsville, PA (US)

(73) Assignees: Jeffrey L. Dershem, Zionsville, PA (US); Deborah L. Dershem, Zionsville, PA (US)

( * ) Notice: Subject to any disclaimer, the term of this patent is extended or adjusted under 35 U.S.C. 154(b) by 0 days.

(21) Appl. No.: 16/539,035

(22) Filed: Aug. 13, 2019

(65) Prior Publication Data
US 2020/0002067 A1 Jan. 2, 2020

Related U.S. Application Data

(63) Continuation-in-part of application No. 15/387,921, filed on Dec. 22, 2016, now Pat. No. 10,378,236.

(51) Int. Cl.
*B65D 63/10* (2006.01)
*F16G 11/14* (2006.01)

(52) U.S. Cl.
CPC .......... *B65D 63/109* (2013.01); *F16G 11/14* (2013.01)

(58) Field of Classification Search
CPC ... Y10T 24/24; Y10T 24/141; Y10T 24/1408; Y10T 24/1498; Y10T 24/1046; Y10T 24/3916; A45C 13/1046; A45C 2013/1061; B65D 63/109
See application file for complete search history.

(56) References Cited

U.S. PATENT DOCUMENTS

| | | | | |
|---|---|---|---|---|
| 1,265,661 A | * | 5/1918 | Howell | F16G 11/02 403/212 |
| 2,699,585 A | * | 1/1955 | Patterson | A01G 17/08 24/16 R |
| 2,917,423 A | * | 12/1959 | Patterson | B65D 63/109 156/182 |
| 2,953,827 A | * | 9/1960 | Patterson | B65D 63/109 24/16 PB |
| 3,048,906 A | | 8/1962 | Patterson | |
| 3,099,271 A | | 7/1963 | Dubelier | |
| 3,673,639 A | * | 7/1972 | Driscoll | A44B 99/00 24/16 PB |
| 3,751,769 A | | 8/1973 | Reiner | |
| 5,081,746 A | | 1/1992 | Czwartacki | |

(Continued)

*Primary Examiner* — Robert Sandy
*Assistant Examiner* — Michael S Lee
(74) *Attorney, Agent, or Firm* — Clark & Brody LP

(57) ABSTRACT

A bungee device includes an elongated shape portion and a cord loop having a pair of cord segments. The elongated shape portion has a flat part on it where the cord loop segments extend therefrom. The cord segment has at least one flat surface that engages the flat part of the elongated shape portion when the bungee device is in use. The cord can include a tab extending from a portion thereof. The tab makes it easier to grasp the cord and stretch it to allow the elongated shape portion to be removed from the space created by the cord segments and release the bungee device from its secured position. The elongated shape portion and cord loop have a one-piece molded construction. The flat part on the elongated shape portion and flat surface on the cord segment can be optional.

19 Claims, 8 Drawing Sheets

(56) References Cited

U.S. PATENT DOCUMENTS

| | | | |
|---|---|---|---|
| 5,715,578 | A | 2/1998 | Knudson |
| 5,860,196 | A | 1/1999 | Murray, Jr. |
| 5,893,456 | A * | 4/1999 | Bosmans ............. B65D 63/109 |
| | | | 206/338 |
| 5,896,623 | A | 4/1999 | Martin |
| 6,044,526 | A | 4/2000 | Putney |
| 6,389,659 | B1 | 5/2002 | Jacobs |
| 6,543,094 | B2 | 4/2003 | D'Addario |
| 6,789,600 | B2 | 9/2004 | O'Neill |
| D615,385 | S | 5/2010 | Arendt |
| 8,850,667 | B2 | 10/2014 | Casubolo |
| 9,802,742 | B1 | 10/2017 | Castro |
| 2003/0041416 | A1 | 3/2003 | D'Addario |
| 2005/0045681 | A1 | 3/2005 | Hancock |
| 2008/0120816 | A1 | 5/2008 | Bosmans |
| 2010/0050394 | A1 * | 3/2010 | Fried .................. B65D 33/1633 |
| | | | 24/30.5 P |
| 2012/0192385 | A1 * | 8/2012 | Burdett ................ B60P 7/0823 |
| | | | 24/369 |
| 2013/0232731 | A1 | 9/2013 | Schradin |
| 2017/0095068 | A1 | 4/2017 | Moreau |

* cited by examiner

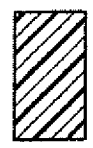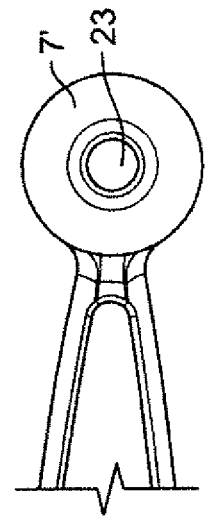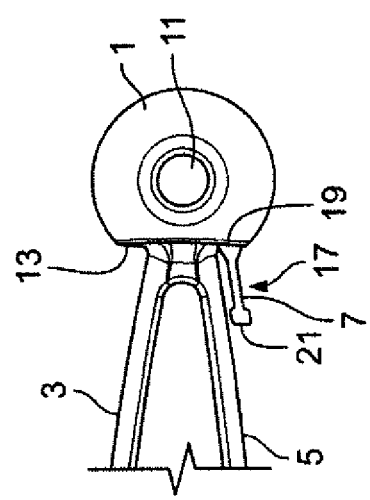

BUNGEE DEVICE AND METHOD OF USE

This application is a Continuation-in-Part of application Ser. No. 15/387,921 filed on Dec. 22, 2016.

FIELD OF THE INVENTION

A bungee ball device includes a molded all one-part ball with a cord loop extending therefrom. The molded ball and cord loop each have a flat surface, the flat surfaces engaging when the bungee ball device is wrapped around and secured to one or more objects to better retain the ball in its secured position.

BACKGROUND ART

Bungee ball devices (aka: canopy ball; tarp ball) are well known in the art. They comprise an elastic cord loop that is attached to a ball. The cord loop is wrapped around one or more objects and the cord loop is stretched so that the ball can be inserted through the opening formed by looped cord segments. Once the ball is slipped through the opening of the stretched loop cord, the cord loop is released and the cord loop is tensioned against the upper part of the ball to secure the bungee ball device in place to hold the wrapped object(s). As the round ball can roll out of the engagement with the cord loop, improvements are needed in these kinds of devices.

SUMMARY OF THE INVENTION

One object of the invention is to provide an improved bungee ball device.

Another object of the invention is a method of using the improved bungee ball device.

In one embodiment, the molded all one-piece bungee ball device comprises a ball having a cord loop connection portion, and a cord loop comprising a pair of cord segments extending from the cord loop connection portion of the upper section of the ball. The upper section of the ball also includes a flat section from which the cord loop connection extends.

The cord segment has at least one flat surface extending along a length thereof. When the pair of cord loop segments are wrapped around one or more objects and the ball is inserted between the space formed by the cord loop segments, the at least one flat surface on the cord comes into contact with a portion of the flat section of the ball to better hold the bungee cord loop in place around the one or more objects. The ball and the cord loop are molded as one piece.

The bungee ball device can also include a tab that extends from the end of the loop created by the cord segments. The tab is configured to be gripped by a user to pull the cord to allow release of the ball held by the cord loop. The tab can have a lip on an end thereof and/or an opening therethrough to facilitate gripping by the user.

The flat surface of the cord can be one of a triangular cross section, a square cross section, a hexagonal cross section, a mostly circular cross section with a flat section, and a rectangular cross section, preferably a triangular cross section.

The ball can also have a bore therethrough to allow for attachment of elongated members like a rope, bungee strap/cord with hook or connectors like a carabiner to the ball.

The invention is also in improvement in the way one or more objects are secured together using a bungee ball device that has a bungee ball and a cord loop extending from the bungee ball, wherein two segments of the cord creating a loop are wrapped around the one or more objects and the bungee ball cord is inserted into an opening formed by the cord and the at least one object. By using the inventive bungee ball device with its flat surface-containing cord and flat section on the ball, the ball is more securely held by the cord via the engage of the flat surface and flat section. The prior art method is further improved when the cord loop includes a tab to facilitate gripping of the cord loop when the device is in use and stretching the cord loop to release the ball.

The ball and cord loop can also be made with any flat parts and just molded in a one-piece construction with a spherical ball (with or without a bore) and circular cross section cord segments.

In another embodiment, the bungee device can use an elongated shape portion with a flat section rather than the generally spherical ball. In this embodiment, the bungee device comprises an elongated shape portion having a cord connection portion and a flat section and a cord loop comprising a pair of cord segments therefrom, each of the cord segments extending from the cord connection portion. Each cord segment includes at least one flat surface extending along a length thereof, and wherein when the pair of cord segments are wrapped around one or more objects and the elongated shape portion is inserted between the cord segments, the at least one flat surface on the cord loop comes into contact with a portion of the flat section of the elongated shape portion to better hold the bungee cord in place around the one or more objects, and further wherein the elongated shape portion and the cord are molded as one piece and the elongated shape portion has a bore therethrough.

The elongated shape portion can have a cylindrical shape with the flat section extending along the length of the portion or the flat section can be formed in a recess formed in a cylindrically-shaped elongate portion. The elongated shape portion can have tapered ends, which can vary in length to change the overall length of the elongated shape portion. When the recess is formed in the cylindrically-shaped elongate portion, the recess forms sections that can hold/retain parts of the cord segment when engaging the flat section of the elongated shape portion. The elongated shape portion can also be polygonal in cross sectional shape as well.

BRIEF DESCRIPTION OF THE DRAWINGS

FIGS. 6*a*-6*f* show different sectional views of the cord of the bungee ball device of FIG. 1.

FIG. 7 shows a schematic drawing of the bungee ball device in use.

FIG. 8 shows an alternative configuration (replacing flat tab) to the end portion of the device of FIG. 1.

DETAILED DESCRIPTION OF THE INVENTION

Figure 1:
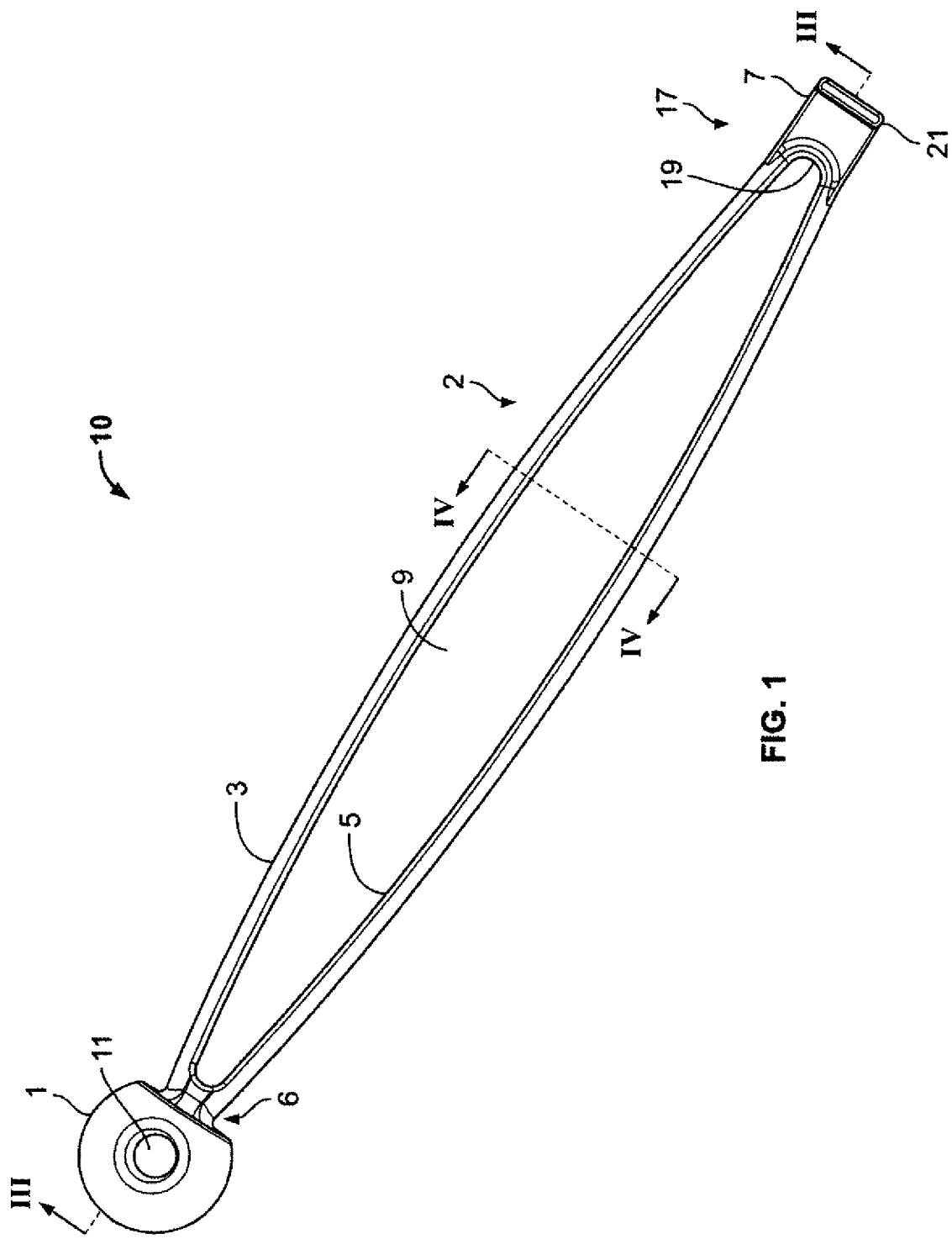
FIG. 1 shows a side view of one embodiment of the bungee ball device.
Figure 2:
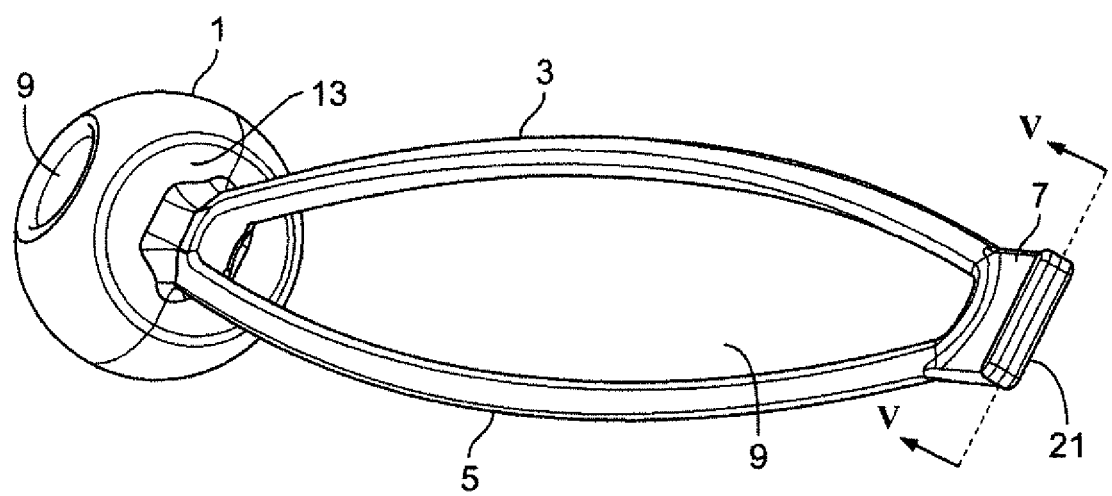
FIG. 2 shows an enlarged version of FIG. 1 from a different angle.
Figure 3:
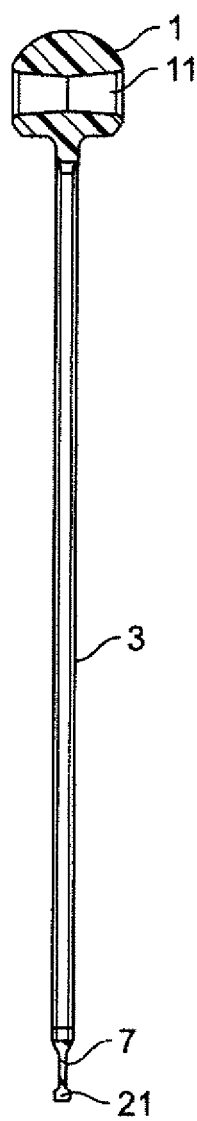
FIG. 3 shows a sectional view along the lines III-III of FIG. 1.
Figure 4:
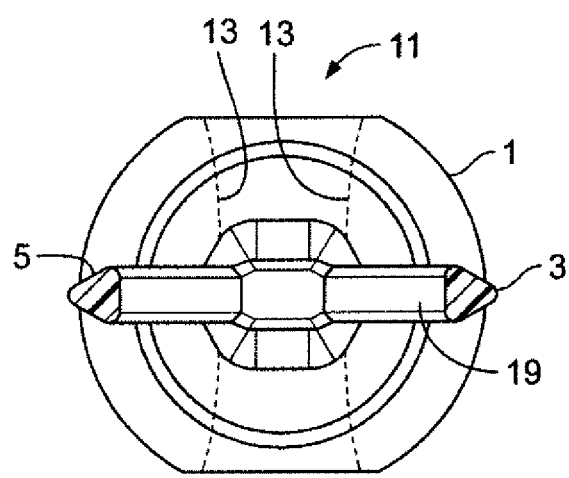
FIG. 4 shows a sectional view along the lines IV-IV of FIG. 1.

FIG. 1 shows one embodiment of the invention with the bungee ball device designated by the reference numeral 10. The bungee ball device has a ball 1, a cord loop 2 made up of a pair of cord segments 3 and 5 extending from a cord connection part 6 of the upper flat section of the ball 1. A tab 7 is provided that extends from the cord loop 2 at an end of the device 10 opposite the ball 1.

The cord segments 3 and 5 form an opening 9 which allows the bungee ball device to be used to secure one or more objects. More particularly, the cord segments 3 and 5 could be wrapped around one or more objects. Once the cord segments 3 and 5 are wrapped around the object, the ball 1 is passed through the opening 9 between the cords and held in place against the cord loop 2 and object(s) so that the device is secured to the object(s)

The ball 1 also can have a bore 11 therethrough. The bore 11 can be used to accommodate another rope or the like to aid in securing the object or secure or attach something else to the bungee ball device 10. The bore 11 could accommodate a bungee strap/cord with hook, carabiner or the like as well. Unlike the bore in a prior art bungee ball device that accommodates the elastic cord, the bore 11 is open on both ends to allow for receipt of another member as the user would desire. In the FIG. 1 embodiment, the axis of the bore is not aligned with the longitudinal axis of the space 9 or cord segments 3 and 5 as is the case with the prior art device. In FIG. 1, the bore has an axis that is perpendicular to the longitudinal axis of the device 10. However, the bore 11 can be located in the ball along different axes with respect to the longitudinal axis of the device 10. For example, it could be moved 90 degrees from the position shown in FIG. 1, so that its axis would coincide with a plane containing the cord segments 3 and 5.

Referring to FIGS. 1-6f, the upper part of the ball includes a flat part 13 on it. The flat part 13 is adjacent the location where the cord as the cord segments 3 and 5 extend from the ball 1, i.e., the cord connection part 6.

Figure 5:
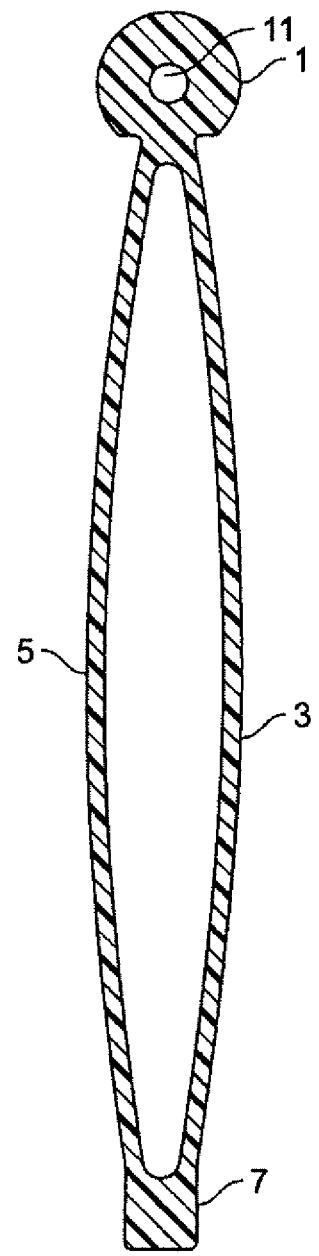
FIG. 5 shows a sectional view along the lines V-V of FIG. 2.

The cord loop 2, including each of the cord segments 3 and 5, also has at least one flat surface. In the FIG. 1 embodiment, the cord segments are 3 and 5 are triangular in cross section as shown in FIGS. 5 and 6a. The triangular cross section is one embodiment of the cross section of the cord and the cord could have other cross sectional shapes providing that at least one flat surface exists. FIG. 6b shows a square cross section, FIG. 6c shows a rectangular cross section, FIG. 6d shows a hexagonal cross section, FIG. 6e shows a circular cross section, and FIG. 6f shows an ovoid cross section, all of these with a flat part 15.

When the bungee ball device 10 is secured to one or more objects and the ball 1 is inserted through the space 9 formed by the cord segments 3 and 5, the flat section of the cord segments 3 and 5 (cord loop 2) engages at the apex of the loop 19 the upper flat section 13 surface of the ball 1. The end portion tab 17 of the device 10 protrudes the flat part 13 of the ball 1. This is shown in FIG. 7, wherein a flat surface 19 of end portion 17 engages the flat portion 13 of the ball 1. With the two flat surfaces 13 and 19 in engagement, there is less tendency for the end portion 17 to slip off the spherical surface of the ball 1.

The tab 7 at the end portion 17 allows the user to grasp the end portion 17 and stretch the cord segments 3 and 5 and more easily allow the ball 1 to pass back through the opening 9 and disengage the bungee ball device 10 from its securing position. The tab 7 can include an enlarged end 21 to make grasping easier if so desired. The tab 7 can take on other shapes that would still facilitate grasping of the end portion 17 to release the ball 1 of the device 10. For example, a ring-shaped tab 7' could be employed that includes an opening 23 to facilitate grasping, see FIG. 8.

The tab 7 is optional and the end portion 17 in FIG. 7 would just constitute a portion of the cord 2, with the flat surface of the cord 2 engaging the flat surface 13 of the ball 1 for better securement of the cord 2 to the ball 1.

The bungee ball device 10 can be made in any length or sold in kit form with different lengths, e.g., nominally 6, 9, and 12 inches in length.

Figure 9:
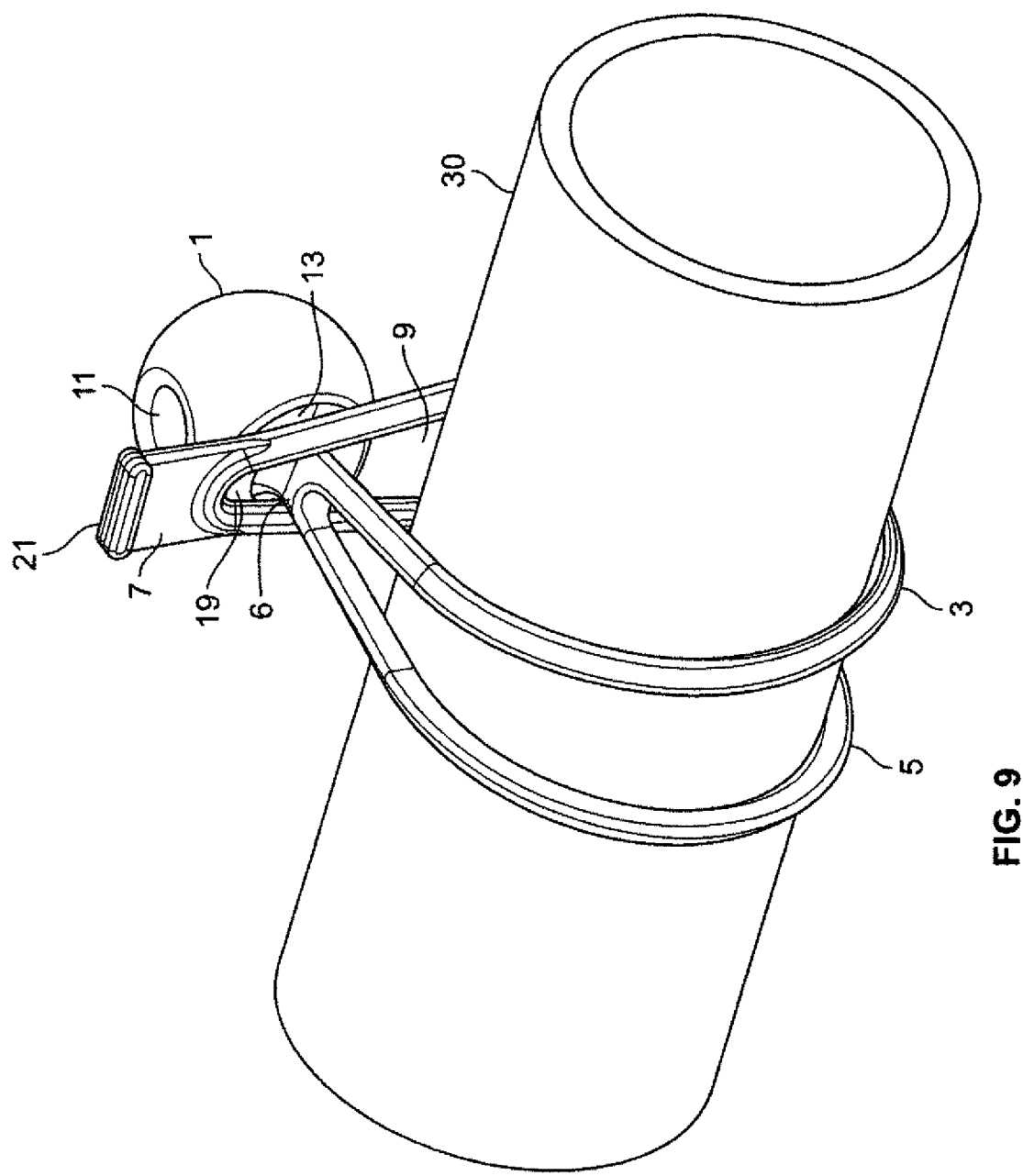
FIG. 9 shows an exemplary use of the bungee ball of the invention.

FIG. 9 shows an exemplary use of the bungee ball. In this drawing, a bungee ball device 10 is shown with its cord segments 3 and 5 wrapped around a cylindrical object 30. The cord segments 3 and 5 are in contact with the flat part 13 of the ball 1, with the cord segments 3 and 5 passing through the opening 9 therebetween. To remove, the tab 7 is pulled to stretch the cord segments 3 and 5. This stretching moves the cord connection part 6 away from the tab 6 and allows the ball 1 to slip through the opening 9 and disengage the bungee ball device 10 from the object 30. This same methodology would be used in reverse to secure the bungee ball device 10 to the object 30. That is, the cord segments 3 and 5 would be wrapped around the object 30. The tab 7 would be stretched so that the ball 1 could be inserted through the opening 9. Once the ball passes through the opening 9, the tab is released and the cord segments contract and the cord connection part 6 engages the apex of the loop 19 and the object 30 is secured by the bungee ball device.

Figure 10A:
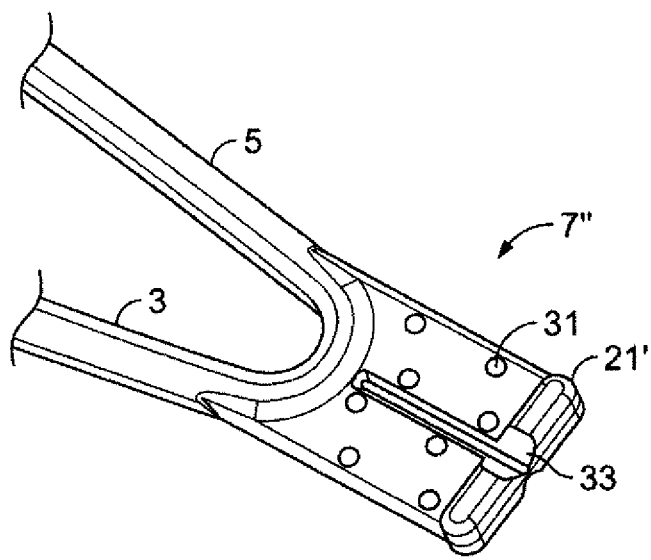
FIGS. 10A and 10B show another configuration for the tab of FIG. 1.
Figure 10B:
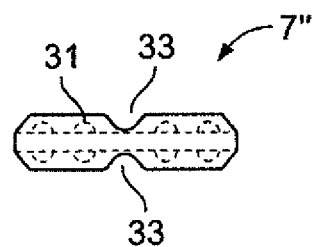

FIGS. 10A and 10B show an alternative design for the tab 7 of the embodiment of FIG. 1. FIG. 10 shows a tab 7'. The tab 7" has protrusions 31 on one of both opposing surfaces to facilitate gripping of the tab when the cord segments are being pulled for attachment or disengagement purposes. The tab 7" also has a groove 33 that extends along the length of the tab 7" and extends through the enlarged end 21'. The groove 33 permits the tab 7" to be folded in half so that it can more easily pass through an opening that may be smaller than the width of the tab. FIG. 10B shows an end view of the tab 7" showing the groove 33 extending into the enlarged end 21'. FIG. 10B also shows the protrusions located on either side of the tab 7".

The bungee ball device can be made of any materials that would provide the desired elasticity for device use. Preferably, the bungee ball device is molded as a one-piece part. The material for molding can be any kind that would provide the stretching function needed for use of the device. Exemplary materials to be used when molding the bungee ball device could include elastomeric compounds of gum rubber, epdm rubber, silicone, silicone vulcanite, thermal cast urethane and extruded/injection molded-thermal plastic urethane. Any type of molding process can be used, with injection molding being preferred.

Figure 11:
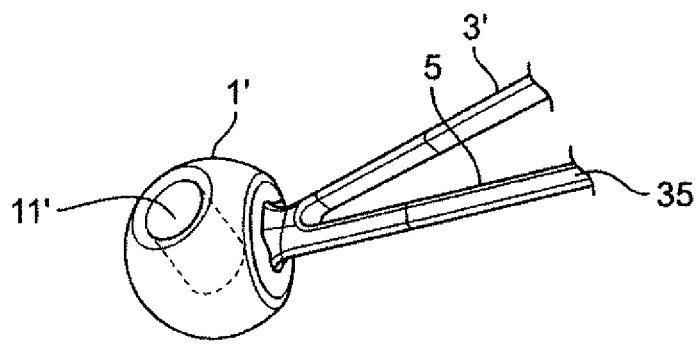
FIG. 11 shows another embodiment of the invention.

Another embodiment of the invention relates to the one piece molded design of the bungee ball. In this embodiment, the flat part on the ball is optional as is the flat part on the cord segments. With reference to FIG. 11, the ball 1' could be spherical in shape, and could employ the bore 11' if so desired, but could be made spherical without any bore. The cord segments 3' and 5' could have a circular cross section 35 and not include one or more flat parts as the cord segments 3 and 5. The cord segments would also terminate in the tab as shown in the other embodiments or just form a loop without any tab, if so desired. While this embodiment may not work as effectively as the embodiment with the flat parts on the ball and cord segments, forming the bungee ball device as a one-piece molded design or construction offers significant manufacturing advantages on its own.

Another embodiment of the invention relates to changing the shape of the ball portion of the device. In this embodiment, the bungee device can have an elongated shape portion that includes the flat part or section of the device as a part thereof. The elongated shape portion can have different cross sectional shapes as well. For example, the elongated shape portion can be football-shaped with its middle portion tapering towards the opposing end portions. The elongated shape could be partially cylindrical in shape with a flat part or section to connect to the cords of the device. The flat part could extend along the length of the elongated shape portion or be formed as a recess in the cylindrically shaped portion. With the flat part of the device in the recess, the recess has spaces or sections can lock the cord segments in place once the device is used to secure an article or the like.

Figure 12:
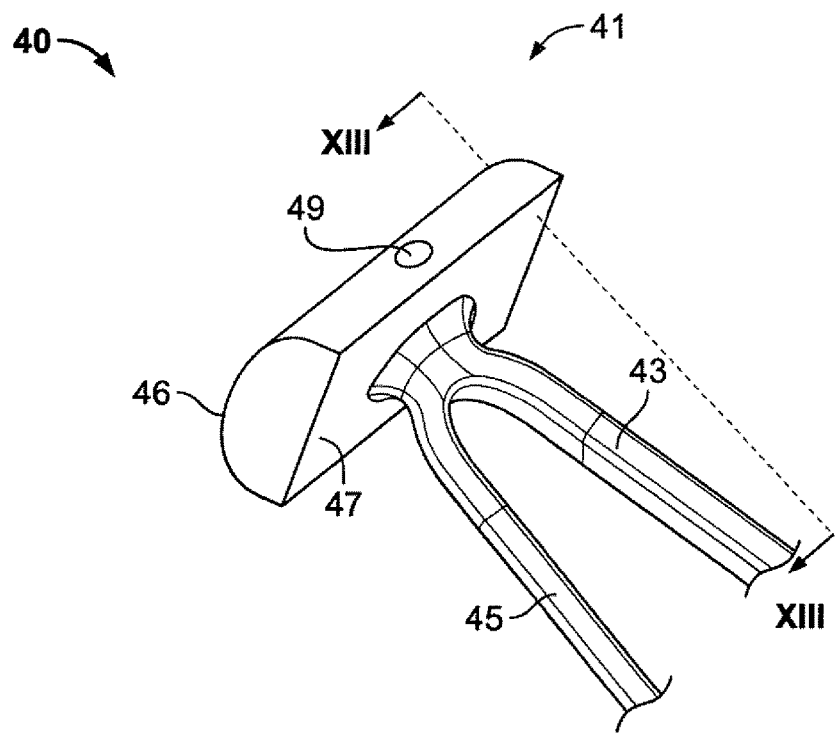
FIG. 12 shows another embodiment of the invention using an elongated shape for the ball portion thereof.

FIG. 12 shows one embodiment of the device with the elongated shape portion and the device designated by the reference numeral 40. The device includes the elongated shape portion 41 and cord segments 43 and 45. The elongated shape 41 is in the shape of a partial cylinder with a flat part 47, where the cord segments 43 and 45 extend therefrom. The elongated shape portion 41 also include the bore 49. The other aspects of this embodiment in terms of the overall construction and cord segment configuration are the same as the other embodiments described above.

Figures 13, 14:
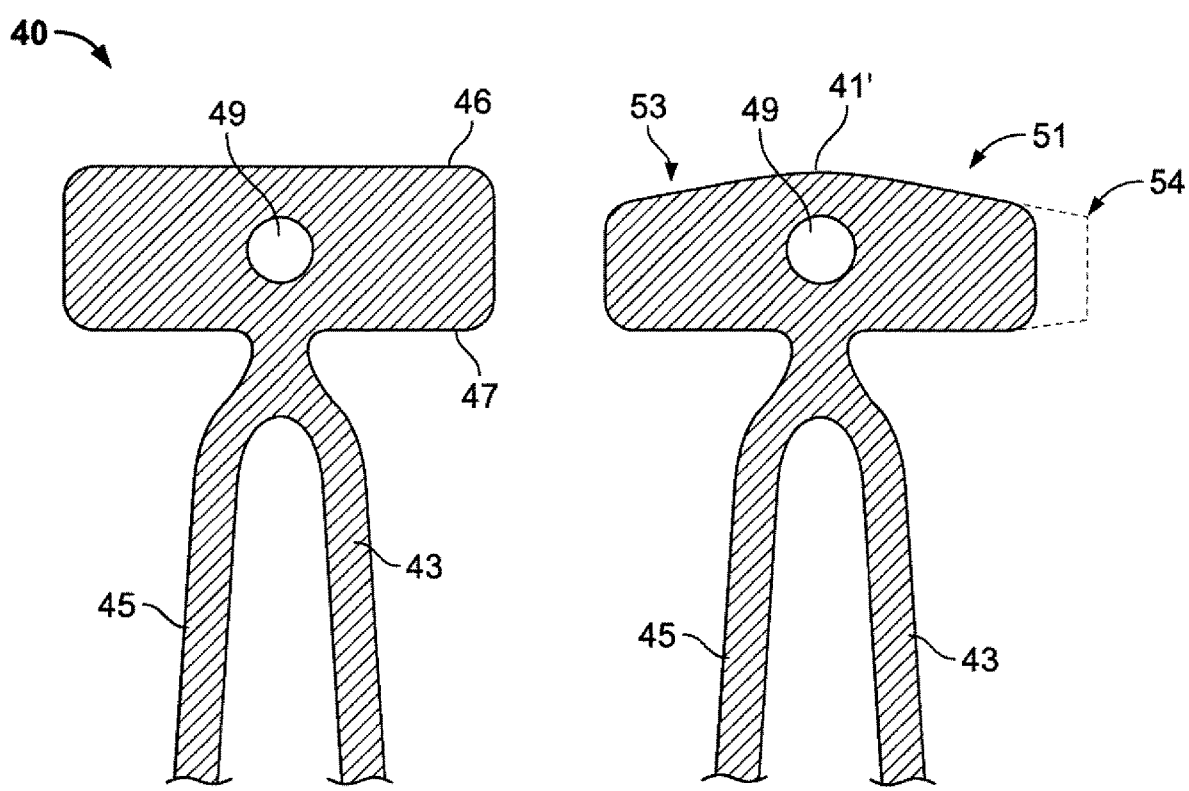
FIG. 13 shows a sectional view along the line XIII-XIII of the bungee device of FIG. 12.
FIG. 14 shows yet another embodiment of the bungee device with a taper.

FIG. 13 shown the bungee device of FIG. 12 in cross section along the line XIII-XIII.

FIG. 14 shows a variation on the FIG. 12 embodiment as reference numeral 50, wherein an elongated shape portion 41' is tapered at the ends 51 and 53 thereof. This variation is more football like in shape. It should be understood that the tapered ends 51 and 53 can extend further in length so that the ends are more pointed, if so desired. A extended taper 54 is shown on one end in cross hatch in FIG. 14. With the tapered ends extended in length, the face 55 of the elongated shape portion 41' is longer, which makes it easier to grasp the tapered ends when manipulating the elongated portion has the elongated shape portion 41'.

Figure 15:
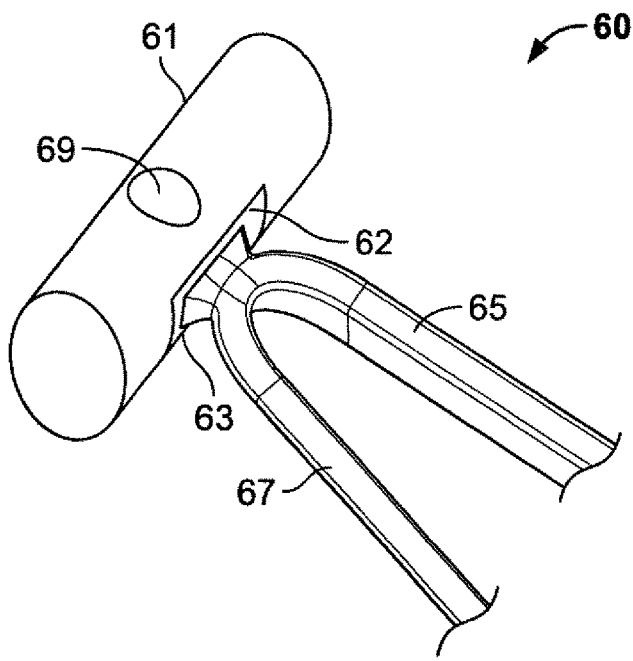
FIG. 15 shows another embodiment of the bungee device of FIG. 12.
Figure 16:
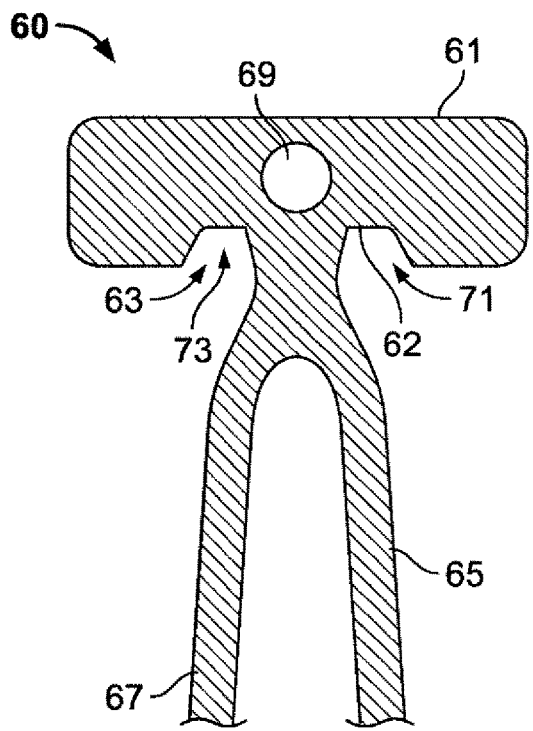
FIG. 16 shows a sectional view along the line XV-XV of the bungee device of FIG. 15.

FIGS. 15 and 16 shows yet another variation of the FIG. 12 embodiment as device 60 in cross section. Here, instead of a flat part extending along the length of the elongated shape portion 61, the flat part 62 is contained in a recess 63. In this way, the elongated shape portion 61 is more cylindrical in overall shape as compared to the elongated shape portion 41 in FIG. 12. The elongated portion also has the bore 69 through it.

With the cord segments 65 and 67 extending from the flat part 62, the recess 63 is divided into two sections 71 and 73. The sections 71 and 73 would receive parts of the cord segments when the device is in use and help retain or lock the parts of the cord segment in place during use.

Figure 17:
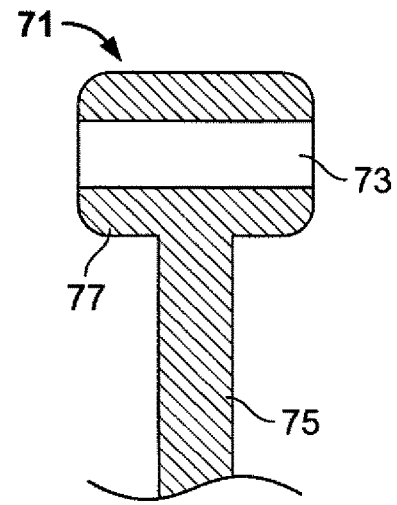
FIG. 17 shows a center cross sectional view of yet another embodiment of the bungee device of FIG. 12.

FIG. 17 shows yet another variation of the elongated shape portion of the bungee device of FIGS. 12-16. Whereas the elongated shape portion with its flat part is a partial cylindrical shape (FIG. 12) or a more substantial cylindrical shape (FIG. 15, the elongated shape portion could have a polygonal shape, e.g., square, rectangular, etc., while still retaining the flat part that provides the base for the cord segments. In FIG. 17, a sectional view is shown of a block-shaped bungee device with an elongated shape portion 71, its bore 73, and one cord segment 75 extending from the flat part 77 (the other cord segment not shown). As with the FIG. 12 embodiment, the other aspects of the bungee device in terms of the method of use, the cord segment configuration, etc. are equally applicable to the other embodiments discussed above.

The inventive bungee ball device can be molded in different colors and include glow in the dark or reflective characteristics.

The inventive bungee device offers significant improvements over the prior art bungee balls by having a one-piece design that is economic in its manufacture. The inventive bungee device also provides a more secure connection as flat surfaces engage when the device is being used and this reduces the chance of the cord slipping around a spherical surface of the ball and releasing the object or objects being secured using the device.

As such, an invention has been disclosed in terms of preferred embodiments thereof which fulfills each and every one of the objects of the present invention as set forth above and provides a new and improved bungee device and method of use.

Of course, various changes, modifications and alterations from the teachings of the present invention may be contemplated by those skilled in the art without departing from the intended spirit and scope thereof. It is intended that the present invention only be limited by the terms of the appended claims.

I claim:

1. A bungee device comprises:
   an elongated shape portion having a cord connection portion and a flat section, the flat section entirely surrounding the cord connection part, the cord connection part extending from the flat section,
   a cord loop comprising a pair of cord segments therefrom, each of the cord segments extending from the cord connection portion,
   each cord segment including at least one flat surface extending along a length thereof,
   wherein when the pair of cord segments are wrapped around one or more objects and the elongated shape portion is inserted between the cord segments, the at least one flat surface on the cord loop comes into contact with a portion of the flat section of the elongated shape portion to better hold the bungee cord in place around the one or more objects, and further wherein
   the elongated shape portion and the cord are molded as one piece and the elongated shape portion has a bore therethrough.

2. The bungee device of claim 1, wherein a tab extends from the cord loop, the tab configured to be gripped to pull the cord to allow release of the ball held by the cord.

3. The bungee device of claim 2, wherein the tab has at least one of a lip on an end thereof and an opening therethrough, the lip further comprising a protrusion extending from a free end of a body of the tab.

4. The bungee device of claim 3, wherein the tab has the lip on an end thereof.

5. The bungee device of claim 3, wherein the tab has the opening therethrough.

6. The bungee device of claim 2, wherein the tab has protrusions on one or both opposing surfaces thereof.

7. The bungee device of claim 1, wherein the cord has one of a triangular cross section, a square cross section, a hexagonal cross section, and a rectangular cross section, and a mostly circular cross section with a flat section.

8. The bungee device of claim 7, wherein the cord has a triangular cross section.

9. In a method of securing one of more objects together using the bungee device of claim 1, wherein two segments of the cord are wrapped around the one or more objects and the bungee device cord is inserted into an opening formed by the cord and the at least one object.

10. The method of claim 9, wherein a tab extends from the cord loop and the tab is pulled to stretch the cord segments and allow release of the elongated shape portion between the cord segments.

11. The bungee device of claim 1, wherein the elongated shape portion comprises one of:
   a) a partial cylindrical shape having the flat section;
   b) a generally cylindrical portion with a recess containing the flat section; or
   c) a polygonal shaped portion with one of the sides of the polygonal shape having the flat section.

12. The bungee device of claim 11, wherein the partially cylindrical shape, the generally cylindrical portion or the polygonal shaped portion have tapered opposing ends.

13. A bungee device comprises:
   an elongated shape portion having a cord connection portion and a flat section, the flat section entirely surrounding the cord connection part, the cord connection part extending from the flat section,
   a cord loop comprising a pair of cord segments therefrom, each of the cord segments extending from the cord connection portion,
   the elongated shape portion and cord loop having a one-piece molded construction and the elongated shape has a bore therethrough.

14. The bungee device of claim 13, wherein a tab extends from the cord loop, the tab configured to be gripped to pull the cord to allow release of the elongated shape portion held by the cord.

15. The bungee device of claim 14, wherein the tab has a lip on an end thereof and/or an opening therethrough.

16. The bungee device of claim 14, wherein the tab has protrusions on one or both opposing surfaces thereof.

17. In a method of securing one of more objects together using the bungee device of claim 13, wherein two segments of the cord are wrapped around the one or more objects and the bungee cord is inserted into an opening formed by the cord and the at least one object.

18. A bungee device comprises:
   an elongated shape portion having a cord connection portion and a flat section,
   a cord loop comprising a pair of cord segments therefrom, each of the cord segments extending from the cord connection portion,
   each cord segment including at least one flat surface extending along a length thereof,
   wherein when the pair of cord segments are wrapped around one or more objects and the elongated shape portion is inserted between the cord segments, the at least one flat surface on the cord loop comes into contact with a portion of the flat section of the elongated shape portion to better hold the bungee cord in place around the one or more objects, and further wherein
   the elongated shape portion and the cord are molded as one piece and the elongated shape portion has a bore therethrough,
   wherein a tab extends from the cord loop, the tab configured to be gripped to pull the cord to allow release of the ball held by the cord,
   wherein the tab has a groove along a length thereof to facilitate reducing a width of the tab by folding thereof.

19. A bungee device comprises:
   an elongated shape portion having a cord connection portion,
   a cord loop comprising a pair of cord segments therefrom, each of the cord segments extending from the cord connection portion,
   the elongated shape portion and cord loop having a one-piece molded construction and the elongated shape has a bore therethrough,
   wherein a tab extends from the cord loop, the tab configured to be gripped to pull the cord to allow release of the elongated shape portion held by the cord,
   the tab having a groove along a length thereof to facilitate reducing a width of the tab by folding thereof.

* * * * *